United States Patent [19]

Abeille et al.

[11] Patent Number: 5,183,219
[45] Date of Patent: Feb. 2, 1993

[54] COUPLING FOR AXIALLY LOCKING A REEL OF A TAPE CASSETTE AND FOR DRIVING IT WITHOUT BACKLASH

[75] Inventors: Pierre Abeille, Antony; Didier Bredif, Kremlin-Bicetre, both of France

[73] Assignee: Schlumberger Industries, Mon Trouge, France

[21] Appl. No.: 703,716

[22] Filed: May 22, 1991

Related U.S. Application Data

[63] Continuation of Ser. No. 434,961, Nov. 6, 1989, abandoned.

[30] Foreign Application Priority Data

Nov. 15, 1988 [FR] France .................... 88 14786

[51] Int. Cl.⁵ ............... B65H 16/10; B65H 18/14; B65H 20/38
[52] U.S. Cl. .................... 242/68.1; 403/326
[58] Field of Search .............. 242/68.1, 68.3, 197–199; 360/96.3, 96.4; 464/160, 180, 89; 403/326, 359; 267/167, 174

[56] References Cited

U.S. PATENT DOCUMENTS

| | | | |
|---|---|---|---|
| 3,083,927 | 4/1963 | Prosin | 242/68.3 |
| 3,322,365 | 5/1967 | Martin et al. | 242/68.3 |
| 3,739,998 | 6/1973 | Esashi et al. | 242/68.3 |
| 3,783,200 | 1/1974 | Jantzen et al. | 242/68.3 X |
| 3,927,848 | 12/1975 | Hochbaum | 242/198 |
| 4,309,002 | 1/1982 | Saitou et al. | 242/198 |
| 4,701,068 | 10/1987 | Andrews et al. | 403/359 |
| 4,805,943 | 2/1989 | Balsells | 267/167 X |
| 4,826,097 | 5/1989 | Grant et al. | 242/68.3 |

FOREIGN PATENT DOCUMENTS

| | | |
|---|---|---|
| 0205951 | 12/1986 | European Pat. Off. . |
| 0270375 | 8/1988 | European Pat. Off. . |
| 1927531 | 5/1969 | Fed. Rep. of Germany . |
| 2029372 | 3/1980 | United Kingdom . |

*Primary Examiner*—Daniel P. Stodola
*Assistant Examiner*—William G. Battista, Jr.
*Attorney, Agent, or Firm*—Lowe, Price, LeBlanc & Becker

[57] ABSTRACT

A coupling for axially locking each reel of a cassette relative to the drive wheel of a magnetic recorder in which the drive wheel has an axial abutment against which the reel may bear. The reel is provided with a central recess having at least one rest projecting radially inward. The coupling includes a resilient locking device carried by the drive wheel and a controller slidably mounted within the drive wheel for actuating the resilient locking device between a retracted, rest position in which the reel can freely slide onto the drive wheel, and a working position in which the resilient locking device is pressed against the rest so that the reel can be axially locked against the axial abutment.

17 Claims, 4 Drawing Sheets

COUPLING FOR AXIALLY LOCKING A REEL OF A TAPE CASSETTE AND FOR DRIVING IT WITHOUT BACKLASH

This application is a continuation of application Ser. No. 07/434,961 filed Nov. 6, 1989, now abandoned.

The present invention relates to a coupling for locking a reel of a tape cassette in position axially relative to support means, and a coupling for driving the reel of a tape cassette without backlash relative to the drive means of a magnetic tape recorder.

BACKGROUND OF THE INVENTION

Recorders/readers using magnetic tape cassettes (referred to herein as "recorders") are known per se and are usually provided with a system for putting the cassette into place so as to put the hub of each reel into position relative to the corresponding drive wheel, while still enabling the cassette to be inserted and removed. Such prior systems comprise a receptacle which is complementary in shape to the shape of the cassette and which has an opening through which the cassette is inserted, together with a mechanism for displacing the receptacle between an inactive position (unloaded) and an active position (loaded), and presser means suitable for applying an axial force on each reel hub so as to maintain the hub in abutment against a drive wheel and prevent any relative axial displacement between the hub and the wheel.

Presser means are known making use of a resilient tongue having one end fixed to the receptacle and having its other end bearing against the hub of the reel.

These prior means are relatively ineffective (relatively little force is exerted) and they are fragile, particularly since they project from the plane of a face of the receptacle. In addition, they require the use of cassettes which are special in structure.

These defects are even less acceptable when the recorder is required to operate in a severe environment.

A first object of the present invention is to remedy these drawbacks and provide a coupling suitable for axially locking a reel of a tape cassette reliably on the drive wheel of a recorder/reader.

SUMMARY OF THE INVENTION

To this end, according to the invention, the coupling for axially locking a reel of a tape cassette relative to the drive means of a magnetic recorder including a drive wheel and an axial abutment against which the reel may bear, said reel being provided with a central recess, includes at least one rest projecting radially inwards from said recess, and at least one locking member linked to said drive wheel and moveable under the action of control means between a retracted, rest position, and a working position where it bears against the end of said rest that is axially furthest from said abutment.

Advantageously, the coupling includes at least two rest and locking member pairs disposed at opposite ends of a diameter.

Preferably, locking members bear against a sloping surface linked to said wheel, and the coupling further includes means for returning said locking members towards the rest position.

More precisely, said locking members are suitable, when in the locking position, for bearing simultaneously against said sloping surface and against the corresponding rests.

In an advantageous embodiment, said locking members are constituted by a torus of resilient material, such as a toroidal spring, disposed coaxially with said wheel.

Advantageously, said control means comprise a rod suitable for sliding relative to said wheel and carrying a plate at one end suitable for pressing said spring against said sloping surface.

In order to simplify the embodiment, the rests are constituted by the driven members (teeth and grooves) of the reel which co-operate with said drive wheel.

In order to control the instant relative to the motion of the cassette at which the reel is locked, said control means are connected to a cassette loading and unloading mechanism.

More precisely, said control means further include a lever mounted to rotate about a stationary axis and suitable for displacing the rod by bearing against the end thereof.

Advantageously, said lever is actuated by a cam fixed to said cassette loading and unloading mechanism and driven thereby.

Preferably, the rod is associated with return means such as a spring for returning it towards a position corresponding to the active position of the locking members.

In addition, it is known that magnetic cassette recorders are required to drive the tape accurately and reliably, particularly when operating conditions are severe (vibration, acceleration, shocks, temperature changes, etc.). This implies, in particular, that the drive wheels should drive the reels without backlash.

Unfortunately, prior driving couplings are of the type. having fluting and cannot achieve this objective.

A second object of the invention is to enable the reels of a tape cassette to be driven without backlash.

To this end, according to the invention, the coupling for rotating a cassette tape reel, the coupling being of the type comprising a drive wheel provided with at least one drive finger suitable for co-operating with axial grooves provided in the reel, has a finger whose width is slightly smaller than the width of the grooves, and it further includes wedging means suitable for exerting a tangential force so as to maintain said finger in abutment against one of the faces of the corresponding groove.

In an advantageous embodiment, said wedging means are constituted by a moving pin, a portion of whose end bears against the side of a groove via a sloping surface such that displacement of the pin gives rise to angular displacement of the reel groove.

Preferably, the wedging, is suitable for moving in the axial direction under the action of a spring.

Advantageously, the surface of the wedging pin which comes into contact with the groove is conical in shape.

Preferably, the wedging pin and said drive finger are disposed substantially on the same diameter.

BRIEF DESCRIPTION OF THE DRAWINGS

Embodiments of the invention are described by way of example with reference to the accompanying drawings, in which.

DETAILED DESCRIPTION

Figure 1:
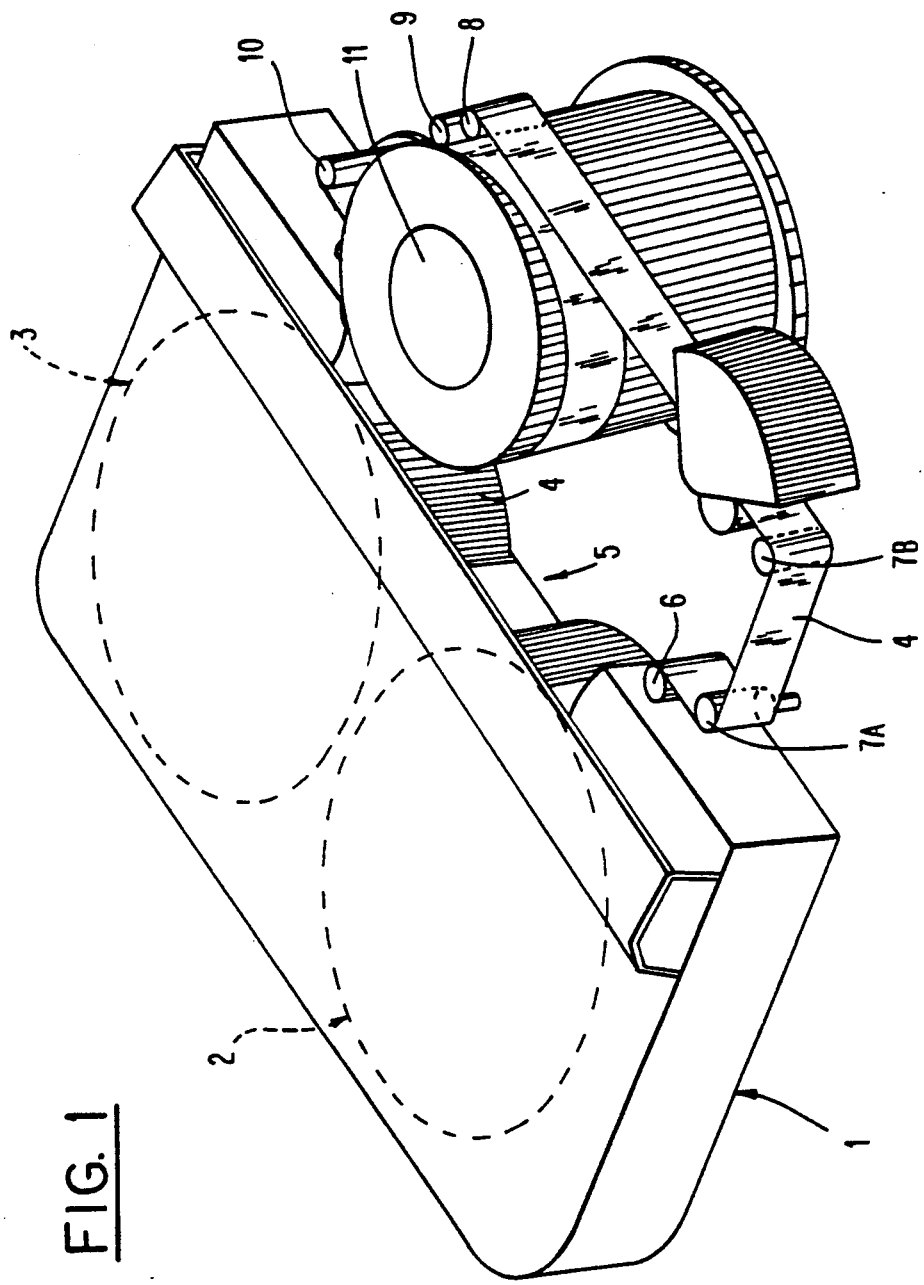
FIG. 1 is a perspective view showing a cassette, a magnetic head drum, and the tape path in a recorder to which the invention applies.

An example of an application for a coupling of the invention is shown in FIG. 1 which is a simplified fragmentary perspective view of a recorder of the type having rotating heads.

A magnetic tape cassette containing two reels, namely a pick-up reel 2 and a pay-out reel 3 having a tape 4 wound thereon, is provided with an opening 5 in one of its faces lying in the plane of the tape. The length of tape disposed in the opening 5 is capable of being extracted from the cassette 1 by fixed or moving wheels (such as the wheels 6, 7A, and 7B) disposed on either side of the opening, and then pulled by loading wheels 8, 9, and 10 for placing the tape on a given path around a drum 11 provided with rotating heads (known per se).

Figure 2:
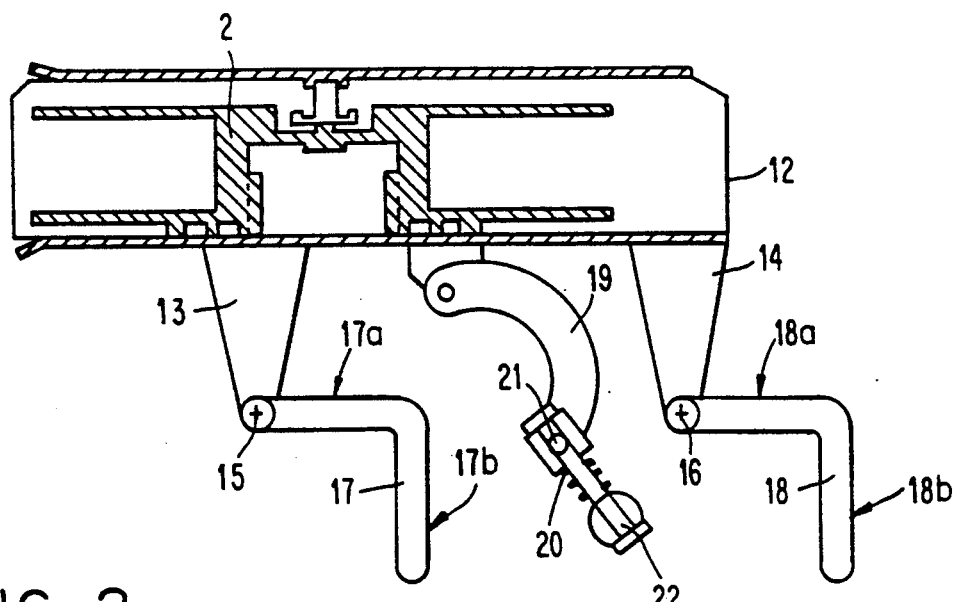
FIGS. 2 and 3 are diagrammatic side views of the cassette loading and unloading mechanism respectively in the unloaded position and in the loaded position.

The cassette 1 is disposed in a receptacle (not shown) suitable for being taken to a working position (as shown in FIG. 1) from a rest position in a manner described below with reference to FIGS. 2 and 3 which are side views in partial section through the receptacle and the cassette loading and unloading mechanism. In FIG. 2, a receptacle 1 containing a cassette 12 (represented by a single reel 2) has at least two vertical lugs 13 and 14 on its base, with each lug having a respective slide 15 or 16 at its projecting end suitable for running along complementary slots or slideways 17 and 18. These have a first horizontal path respectively 17A and 18A, followed by a second path at right angles to the first and thus extending vertically, and given respective references 17B and 18B. It should be understood that the notions of "vertical" and "horizontal" are given with reference to the starting position of the receptacle and the cassette which is normally shown as being horizontal. The cassette loading and unloading mechanism comprises a curved connecting rod 19 hinged at a first end to the base of the receptacle 1 and hinged at its second end about an axis 21 to a crank 20 with the crank 20, itself being hinged about an axis 22 which is stationary relative to the recorder. In FIG. 2 the receptacle is shown as being in the rest position, with the cassette inserted therein.

Figure 3:
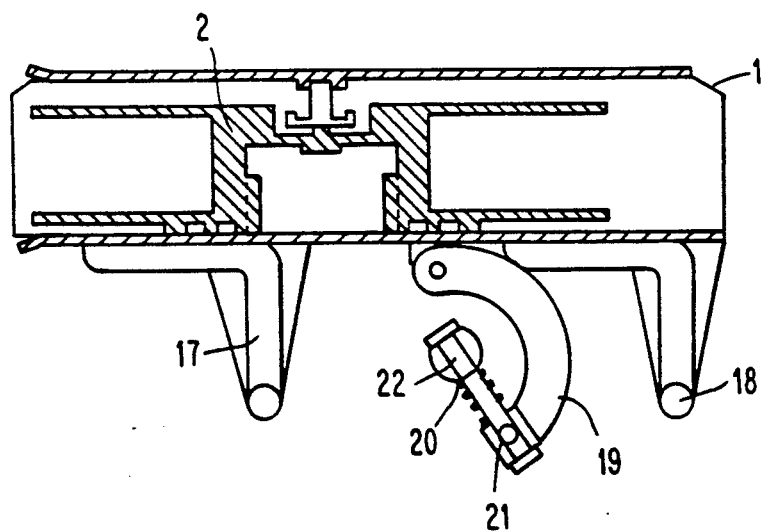

FIG. 3 shows the apparatus of FIG. 2 with the receptacle in its position corresponding to the working position shown in FIG. 1. It can be seen that the receptacle 1 has been moved in translation horizontally and vertically corresponding to the paths of the slideways 17 and 18, with the crank 20 having rotated about the stationary axis 22.

Figure 4:
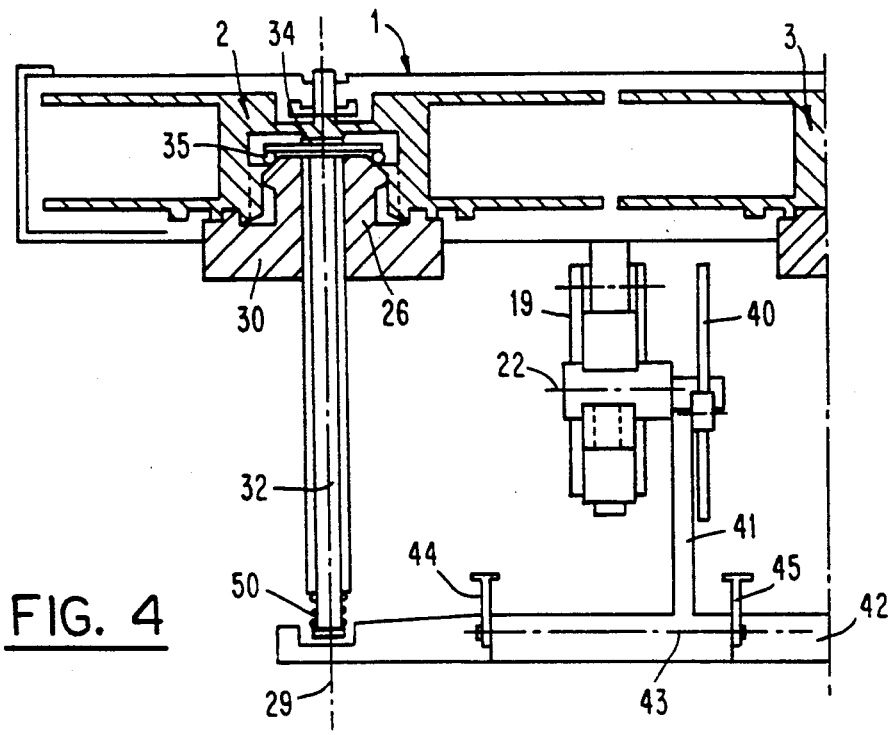
FIG. 4 is a front view of the mechanism shown in FIG. 3 and also incorporating a locking coupling in accordance with a first aspect of the invention.

FIG. 4 is an axial section through the coupling of the invention serving to lock the reel of the cassette axially relative to the cassette drive.

The cassette drive is constituted by a drive wheel having fluting (known per se). The wheel is rotated by conventional drive means (e.g. a motor) and not shown.

Figure 5:
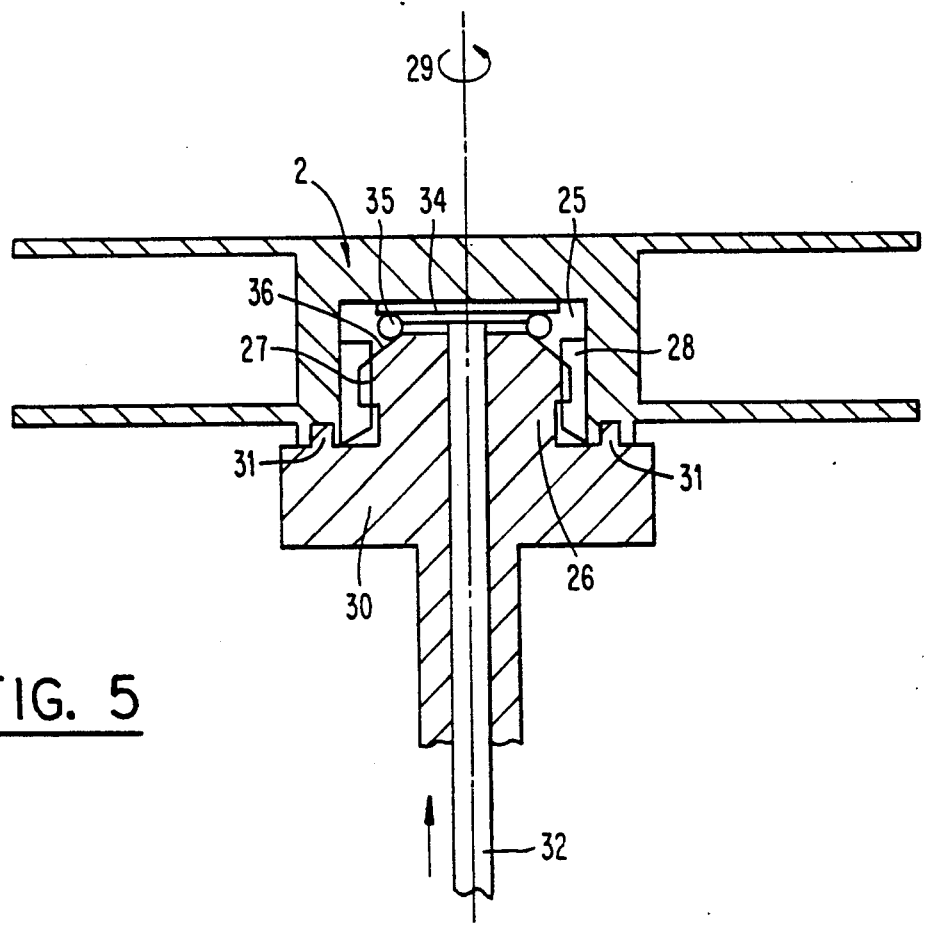
FIGS. 5 and 6 are detailed section views through the locking coupling in accordance with the first aspect of the invention shown respectively in the rest position and in the locked position.
Figure 6:
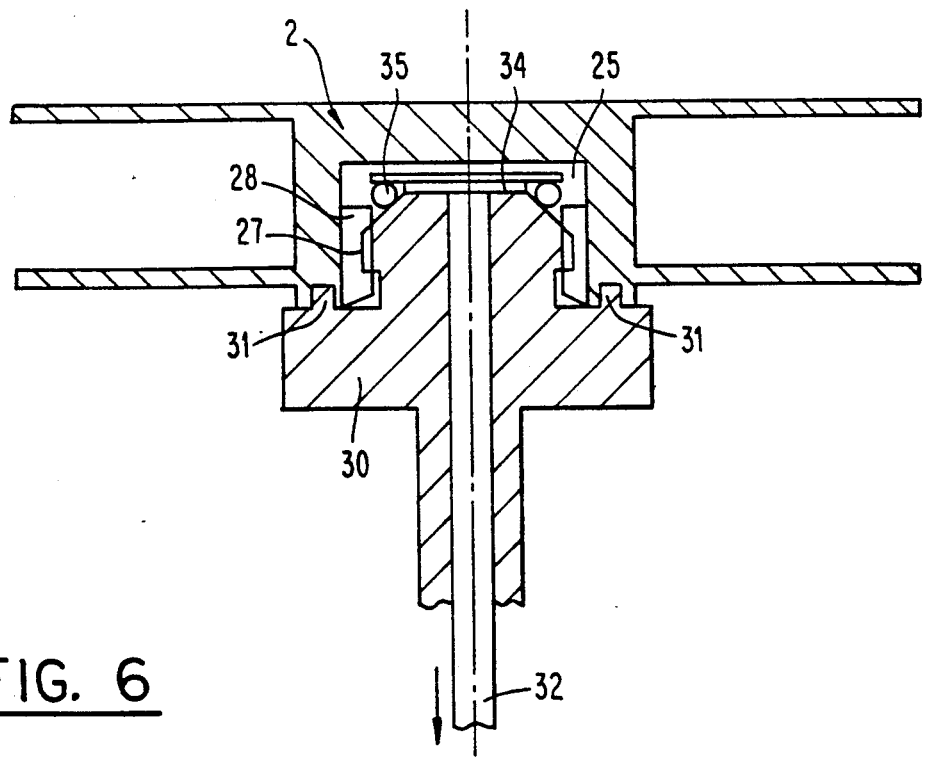

FIGS. 5 and 6 are diagrammatic section views through a reel and the locking coupling of the invention.

In conventional manner, the reel 2 includes a central recess 25 suitable for receiving a drive wheel 26 having fluting 27. Fluting 28 complementary to the fluting provided on the drive wheel 26 is provided on the axial wall inside the recess 25. The drive wheel also includes a base 30 provided with abutment members 31 against which the base of the reel 2 may bear. In FIGS. 5 and 6, the reel 2 is shown with the cassette being in the position corresponding to the rest and working positions, respectively of FIG. 1.

The means for locking the reel on the drive wheel 26 comprise a rod 32 extending coaxially with the drive wheel and provided at its top end with a plate or disk 34. The coaxial recess 25 provided in the reel 2 is generally cylindrical in shape and extends in the direction of the axis 29 far enough to leave an empty space between the top end of the wheel and the top wall of the recess. This space is suitable for receiving the disk 34 fixed to the rod 32 together with a torus of resilient material such as a toroidal spring 35 whose diameter is substantially equal to the diameter of the disk 34. The top end of the drive wheel has a conical surface against which the toroidal spring 35 rests. The disk 34 is advantageously provided with a circular shoulder against which the toroidal spring 35 rests so as to limit its inwards movement.

In the rest position as shown in FIG. 5, the rod 32 is in its high position and the plate or disk 34 bears against the end wall of the recess with the toroidal spring being in a minimum diameter configuration as limited by the shoulders provided on the disk 34.

Under the effect of an axial force (delivered by a device described below), the rod 32 moves vertically downwards entraining the disk 34 which is fixed thereto and thereby radially extending the toroidal spring 35. Since the spring is bearing against the conical surface 36 and is subjected to a vertical downwards force, it is moved radially causing its diameter to increase. The toroidal spring thus rests against the top portion of the fluting 28 in the reel 2. The movement of the rod 32 is limited by the disk 34 bearing against the top portion of the drive wheel 26. The coupling is then in its locked position as shown in FIG. 6. It will be understood that in this position the reel 2 is prevented from moving in translation both downwards by virtue of the abutment 31, and above all upwards by virtue of the co-operation between the toroidal spring 35 and both the disk 34 and the fluting 28 in the reel.

The locking coupling of the invention makes it possible to lock the reel 2 "from below" without requiring any external mechanism as in the prior art.

The device for actuating the rod 32 is shown in FIG. 4 which shows apparatus incorporating the coupling shown in FIGS. 5 and 6 and the mechanism shown in FIGS. 2 and 3. Items and units which are identical or similar have the same references from one figure to another.

A cam 40 is provided to rotate about the stationary axis 22 and its profile is suitable for bearing against the end of a lever 41 extending orthogonally to the stationary axis 22 (and thus parallel to the axes of the reels). The lever 41 is fixed to an arm 42 extending transversely relative thereto and hinged about a stationary axis 43 running parallel to the axis 22, by means of two lugs 44 and 45. The end of the arm 42 is suitable for bearing against the bottom end of the rod 32.

The locking coupling of the invention as shown in FIGS. 4, 5, and 6 is linked to the cassette loading and unloading mechanisms in the sense that movement of the receptacle 1 causes the moving parts of the locking coupling to move at an appropriate instant in the cassette loading and unloading cycle.

Thus, when the cassette, and thus the receptacle 1, moves from the rest position (FIG. 2) to the working position (FIG. 3), the cam 40 is rotated about the axis 22 and the lever 41 bearing thereagainst is caused to pivot about the axis 43 at the end of the downstroke of the receptacle 1; as a result the arm 42 is itself rotated about the same axis and therefore bears against the bottom end of the rod 32 in order to raise it. The rod is then in the position shown in FIG. 5, and with the receptacle continuing its descent (and the cam 40 to rotate), the arm 42 is caused to rotate in the opposite direction, thereby causing the rod 32 to move downwards, driven by a return spring 50 provided at the base of the rod 32. On moving vertically downwards, the rod 32 causes the toroidal spring 35 to expand radially and take up the locking position shown in FIG. 6.

Conversely, when a cassette is to be unloaded, the receptacle is caused to move from its working position (FIG. 3) to its rest position (FIG. 2), and during this reverse travel the arm 42 is rotated about the axis 43 so as to raise the rod 32, thereby releasing the fluting of the reel 2 by radially contracting the toroidal spring 35, and thus releasing the reel.

FIG. 4 shows the locking coupling for pick-up reel 2, but it should naturally be understood that a recorder is provided, in fact, with an identical coupling for pay-out reel 3.

A second aspect of the invention is described below with reference to FIGS. 7 and 8 which are respectively a section through a reel and drive means of the invention, and a fragmentary plan of the coupling shown in FIG. 7.

In this second aspect, an object of the invention is to drive the reel 2 without backlash.

Figure 7:
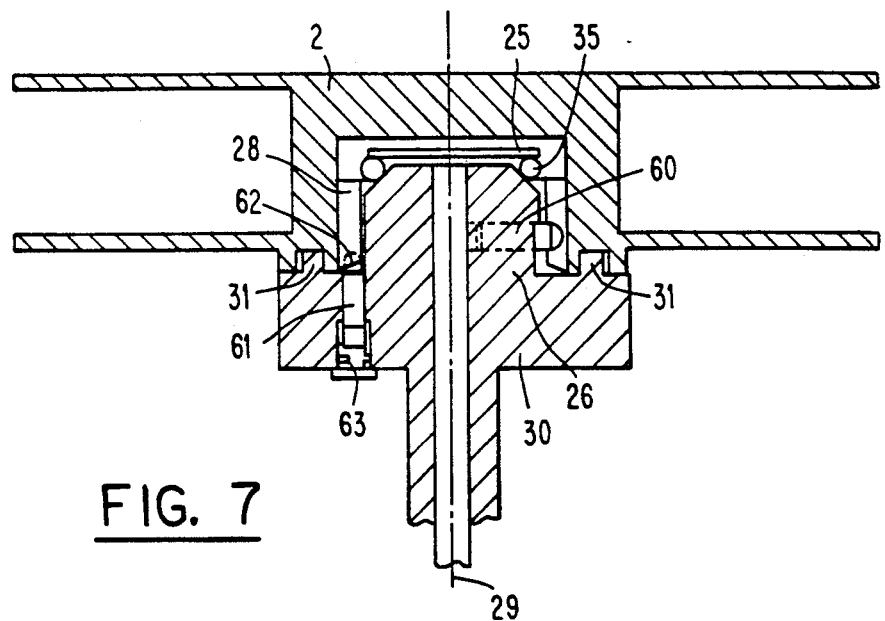
FIG. 7 is a section view through a coupling in accordance with a second aspect of the invention, for driving a reel without backlash.
Figure 8:
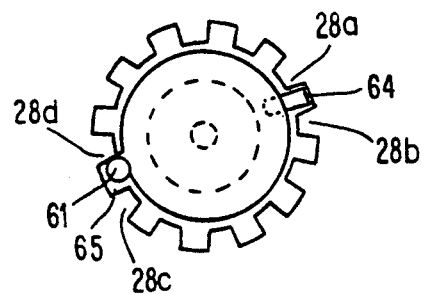
FIG. 8 is a fragmentary plan view of the coupling shown in FIG. 7.

Members and items shown in FIGS. 7 and 8 which are similar to or have the same function as those in FIGS. 1 to 6 are given the same references. Thus, there is a reel 2 with an internal recess 25, a drive wheel 26 provided with a base 30 and abutment means 31, and fluting 28 disposed in the axial recess 25 of the reel.

Advantageously, the coupling also includes the locking means described above, it being understood that this disposition is optional.

The backlash-free drive coupling comprises firstly a radial drive finger 60 suitable for co-operating with the fluting 28 in the reel, and secondly an axial pin 61.

The radial drive finger 60 projects from the axial surface of the drive wheel and is substantially complementary in shape (at least at its end) to the shape of the grooves in the fluting 28. The radial drive finger 60 and the axial pin 61 are preferably disposed on a diameter of the drive wheel. The locking pin has an end surface which is conical in shape and its dimensions are substantially complementary to the grooves such as 64 in the fluting of the reel 2.

The axial pin 61 is associated with a spring 63 disposed at its bottom end (its end furthest from the reel) so as to exert a force on the pin urging it towards the fluting.

The operation of the backlash-free coupling of the invention is described below.

When the reel, entrained by the movement of the receptacle, reaches the abutments 31 of the drive means, the radial drive finger 60 penetrates into a groove 64 between fluting ribs 28a and 28b. The finger is received in the groove with a certain amount of clearance. To this end, the diameter of the radial finger 60 is slightly smaller than the width of each groove 64. The relative angular disposition of the radial finger 60 and the axial pin in such that when the drive finger 60 is disposed in a groove 64 in the fluting 28, the axial pin 61 penetrates partially into a groove 65 in the fluting 28 with its conical end bearing in part on the bottom ends of the ribs of the fluting 28. Thus, under the effect of the spring 63 and the conical end surface of the pin, the pin tends to raise the reel and offsets it angularly in one direction or the other so that the drive finger comes into abutment against one of the sides of the groove 64 in which it is received. The pin tends to penetrate further into the corresponding groove 65 in the fluting 28. The reel is thus locked against the drive finger 60 and the axial pin 61 without any angular backlash.

We claim:

1. A coupling for axially locking a reel of a cassette relative to the drive wheel of a magnetic recorder, said drive wheel having an axial abutment against which said reel may bear, said reel being provided with a central recess having at least one rest projecting radially inward, said coupling including:
   resilient locking means including a toroidal spring carried by a sloping surface of said drive wheel; and
   control means separate from said resilient locking means and slidably mounted within said drive wheel for tensioning said resilient locking means from a rest position in which said reel can freely slide onto said drive wheel to a working position in which said reel is locked against said abutment.

2. The coupling of claim 1, wherein said at least one rest is a fluting provided in said central recess.

3. The coupling of claim 2 further comprising a plurality of flutings projecting radially inward from said central recess, wherein said drive wheel comprises at least one drive finger receivable in a groove between adjacent flutings, said drive finger having a width slightly smaller than the width of said groove.

4. The coupling of claim 3, wherein said drive wheel further comprises an axial pin adapted to maintain said drive finger in abutment against one face of said groove.

5. The coupling of claim 4, wherein said drive finger and said axial pin are diametrically opposed on said drive wheel.

6. The coupling according to claims 1 or 2, wherein said control means is coupled to a cassette loading and unloading mechanism.

7. The coupling of claim 6, wherein said loading and unloading mechanism includes a lever mounted to rotate about a stationary axis and suitable for sliding said rod by bearing against the end thereof.

8. The coupling according to claim 7, wherein said lever is actuatable by a cam fixed to said cassette loading and unloading mechanism.

9. The coupling of claim 8 further comprising a plurality of flutings projecting radially inward from said central recess, wherein said drive wheel comprises at least one drive finger receivable in a groove between adjacent flutings, said drive finger having a width slightly smaller than the width of said groove.

10. The coupling of claim 9, wherein said drive finger and said axial pin are diametrically opposed on said drive wheel.

11. The coupling of claim 10, wherein said drive finger and said axial pin are diametrically opposed on said drive wheel.

12. The coupling of claim 7 further comprising a plurality of flutings projecting radially inward from said central recess, wherein said drive wheel comprises at least one drive finger receivable in a groove between adjacent flutings, said drive finger having a width slightly smaller than the width of said groove.

13. The coupling of claim 12, wherein said drive wheel further comprises an axial pin adapted to maintain said drive finger in abutment against one face of said groove .

14. The coupling of claim 13, wherein said drive finger and said axial pin are diametrically opposed on said drive wheel.

15. The coupling of claim 6 further comprising a plurality of flutings projecting radially inward from said central recess, wherein said drive wheel comprises at least one drive finger receivable in a groove between adjacent flutings, said drive finger having a width slightly smaller than the width of said groove.

16. The coupling of claim 15, wherein said drive wheel further comprises an axial pin adapted to maintain said drive finger in abutment against one face of said groove.

17. The coupling of claim 16, wherein said drive finger and said axial pin are diametrically opposed on said drive wheel.

* * * * *